United States Patent

[11] 3,588,321

[72] Inventor Walter Bruch
Hannover, Germany
[21] Appl. No. 736,328
[22] Filed June 12, 1968
[45] Patented June 28, 1971
[73] Assignee Telefunken Patentverwertungsgesellschaft m.b.H.
Ulm/Donau, Germany
[32] Priority June 14, 1967, June 12, 1968
[33] Germany
[31] P 15 12 613.3 and T34599

[54] CIRCUIT FOR MODIFYING THE COLOR INFORMATION OF A TELEVISION SIGNAL
3 Claims, 21 Drawing Figs.

[52] U.S. Cl. .......... 178/5.2, 178/5.4
[51] Int. Cl. .......... H04n 1/46, H04n 5/42
[50] Field of Search .......... 178/5.4, 5.4 (MC), 5.2 (A), 5.4 (P)

[56] References Cited

UNITED STATES PATENTS 3,255,305 6/1966 Chatten .......... 178/5.4MAT
3,443,025 5/1969 Gold .......... 178/5.4RW

OTHER REFERENCES

" Demodulation Circuits for Pal Color Television Receivers" ELECTRONIC ENGINEERING, Sept. 1964, pp. 606—611

COLOR TELEVISION with particular reference to the PAL SYSTEM, pp. 146— 150

*Primary Examiner*—Richard Murray
*Assistant Examiner*—Donald E. Stout
*Attorney*—Spencer and Kaye ABSTRACT: Circuits for modifying the color information contained in a color television signal by producing, from the modulated permanent subcarrier of the originally produced video signal portion, an additional signal whose amplitude and phase is a predetermined function of the amplitude and phase of such permanent subcarrier, and adding the additional signal to the modulated permanent subcarrier of the originally produced video signal for providing a new permanent subcarrier containing color information which is modified relative to that contained in the permanent subcarrier of the originally produced video signal.

INVENTOR
Walter Bruch
BY Spencer & Kaye
ATTORNEYS

INVENTOR
Walter Bruch

BY Spencer & Kaye

ATTORNEYS

INVENTOR
Walter Bruch

BY Spencer & Kaye
ATTORNEYS

INVENTOR
Walter Bruch

BY Spencer & Kaye
ATTORNEYS

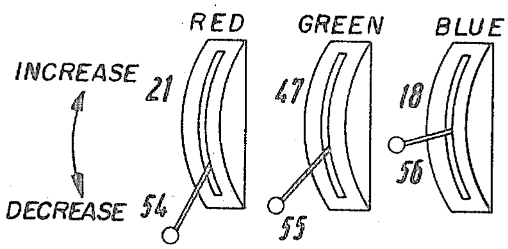
Fig. 8
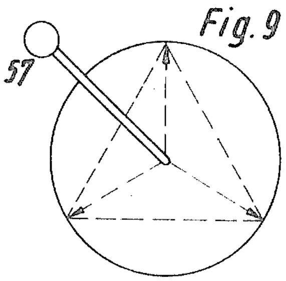
Fig. 9
Fig. 10
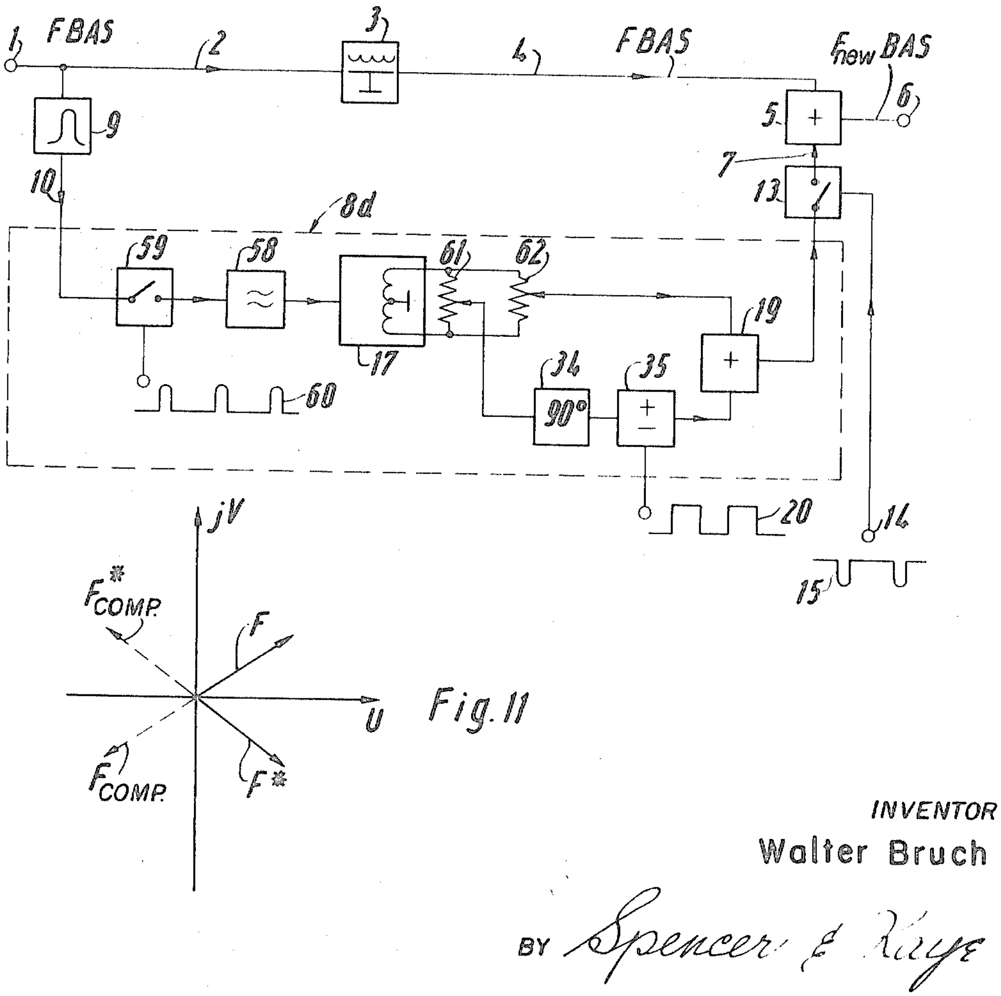
Fig. 10, Fig. 11
INVENTOR
Walter Bruch
BY Spencer & Kaye
ATTORNEYS INVENTOR
Walter Bruch
BY Spencer & Kaye
ATTORNEYS INVENTOR
Walter Bruch BY Spencer & Kaye
ATTORNEYS INVENTOR
Walter Bruch BY Spencer & Kaye
ATTORNEYS

CIRCUIT FOR MODIFYING THE COLOR INFORMATION OF A TELEVISION SIGNAL

BACKGROUND OF THE INVENTION

In the PAL [phase alternating line] color television system the correct color, or hue, is always reproduced independently of phase errors in the transmission path or of phase errors in the reference carrier used to demodulate the signal. A change in the color is not possible without taking special measures because, due to the PAL phase inversion and due to the formation of an electrical mean value in the PAL receiver through the provision of a controlled delay, the correct color is always reproduced.

In many cases, however, it is desired to change the color, particularly the tint of the reproduced image, in accordance with subjective considerations. This problem exists particularly when broadcasting from a studio, and the means for varying the tint should then be effective on all receivers.

If, for example, a signal received from a distant studio has an undesirably strong red tint due to particular lighting conditions during filming or because the film being broadcast has insufficient color qualities, it may be desired to reduce the red component of the resulting color picture. It can also be desired, for example by the director of the program, to impart a certain color tint, e.g. green, to the picture, for artistic reasons for example. The shift in overall color, e.g. the increase or decrease in a certain color, can also be desired by the director in order to achieve certain special effects.

It is known that the color information in a PAL signal can be adjusted (as disclosed in German Pat. No. 1,178,892) by causing the chrominance subcarrier, for example in a PAL time delay resolving circuit, to be resolved into its two chrominance subcarrier frequency components and by providing means for varying the amplitude of these two components in inverse relation to each other. In this system, however, the chrominance subcarrier of the FBAS color video signal must first be selectively evaluated and must then be divided into two signals. The FBAS signal contains the picture information including the modulated chrominance subcarrier, the luminance signal and the color burst.

This operation must therefore be performed in the main channel path of the chrominance subcarrier.

It is particularly desired in a studio, however, to effect such color variation in the FBAS color video signal without a selective separation, or even a demodulation, of the chrominance subcarrier being necessary.

This cannot be accomplished by the known circuit. The known circuit furthermore has a limited effectiveness.

SUMMARY OF THE INVENTION

It is a primary object of the present invention to simplify modifications of the color information contained in a color television signal.

Another object of the invention is to permit substantially any desired modification to be effected in a simple manner.

Still another object of the invention is to permit the color balance of a color television picture to be varied in any desired manner.

Yet a further object of the invention is to permit the colors of such a television picture to be shifted by any desired amount.

A further object of the invention is to permit the amplitude of the modulated chrominance subcarrier to be modified as a function of the average picture brightness.

These and other objects according to the invention are achieved by the provision of a novel circuit for modifying the color information contained in the originally produced video signal portion of a television signal. This circuit essentially includes signal-adding means having a first input, a second input, and an output, conductor means connected to the first input for conducting the modulate chrominance subcarrier of the originally produced video signal portion thereto, and processing circuit means for producing an additional modulated chrominance subcarrier signal whose amplitude and phase is a predetermined function of the amplitude and phase of such modulated chrominance subcarrier. The output of the processing circuit means is connected to the second input of the signal-adding means for causing the output of the adding means to provide a new chrominance subcarrier containing color information which is modified relative to that contained in the chrominance subcarrier of the originally produced video signal portion.

BRIEF DESCRIPTION OF THE DRAWINGS

FIG. 8 is a simplified perspective view of the manual control elements of the embodiment of FIG. 6.

FIG. 9 is a perspective view of another form of manual control elements which can be used with the embodiment of FIG. 6.

FIG. 10 is a block diagram of yet another embodiment of the invention.

FIG. 11 is a vector diagram used in explaining the operation of the embodiment of FIG. 10.

DESCRIPTION OF THE PREFERRED EMBODIMENTS

In all of the figures, F represents voltages of the chrominance subcarrier, which can be considered as vectors, U represents the vector component which is not shifted, or inverted, with respect to the PAL modulation axes; *j*V represents the component which is shifted by 180°, or inverted, with respect to its axis. U and V may be constituted by the usual I and Q chrominance components or by any other suitable components.

Figure 1:
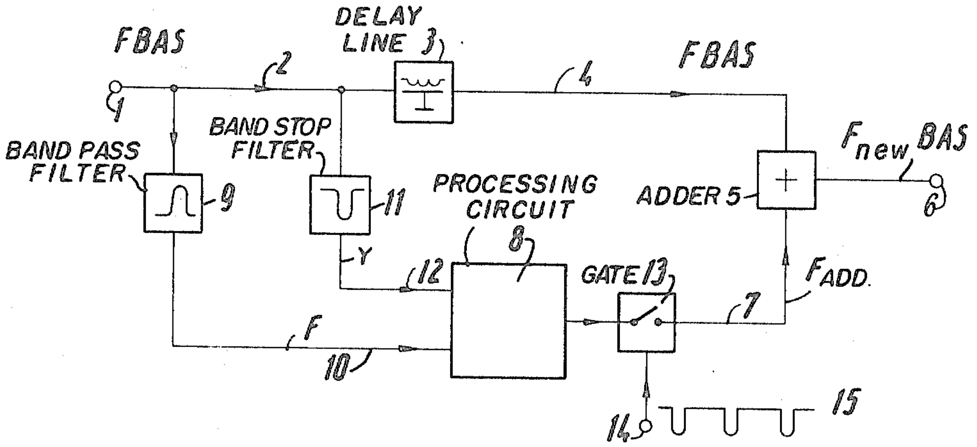
FIG. 1 is a block circuit diagram illustrating the basic arrangement of circuits according to the invention.

In FIG. 1 the FBAS color video signal at the station is fed from a terminal 1 via a line 2, a delay line 3 and a line 4 into an adder 5 at whose output terminal 6 an FBAS color video signal which can have a modified chrominance subcarrier $F_{new}$ appears. In order to influence the chrominance subcarrier in such a manner as to vary the tint, the adder 5 also receives, via a line 7, an additional potential $F_{add}$ having a controllable amplitude.

The additional potential is generated in a processing circuit 8 to which is delivered, via a line 10, the modulated chrominance subcarrier, which has been selectively extracted from the FBAS color video signal by means of a band-pass filter 9, and, if required, a luminance signal, which has been separated, by means of a band-stop filter 11, from components of the chrominance subcarrier frequency, via a line 12. The processor 8 generates the additional potential of the chrominance subcarrier and this is fed into line 7 via a gate 13.

Gate 13 is controlled so as to be blocked during each scanning line return period, this being accomplished by means of pulses 15 applied to a terminal 14, so that during these time periods no additional potential is applied to the adder 5 and the color-synchronizing signal, or color burst, of the FBAS color video signal coming from line 4 is unaltered.

Figure 12:
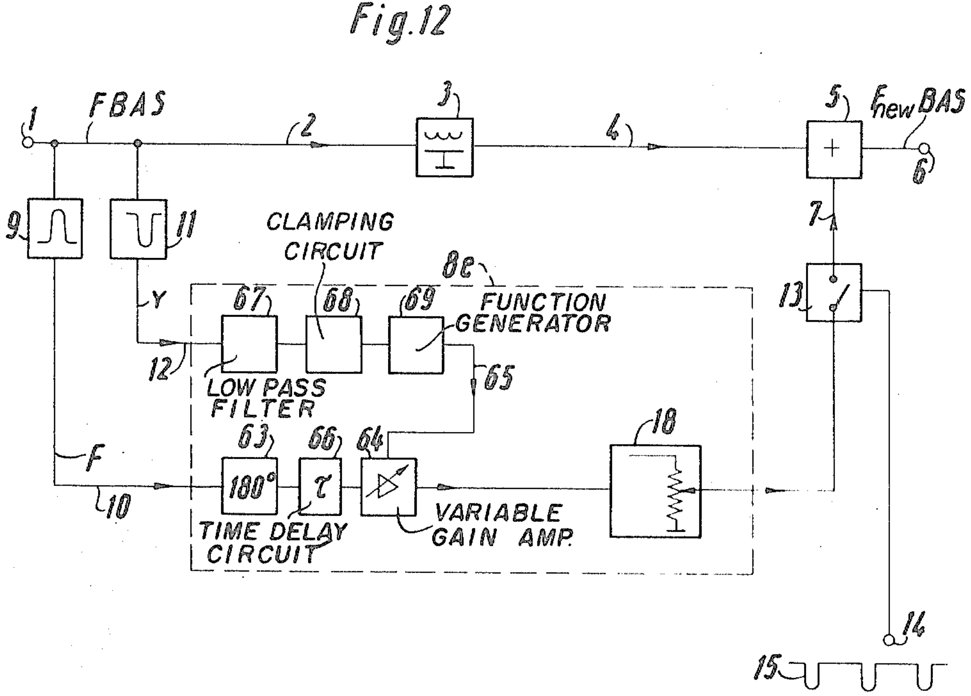
FIG. 12 is a block diagram of still another embodiment of the invention.

The luminance signal Y appearing on line 12 is here required only for the operation of a particular embodiment of the processing circuit, as shown in FIG. 12. It can serve, for example, to make the additional voltage dependent on the present amplitude of the luminance signal, as will be explained in detail below.

The delay line 3 serves to establish the correct time relationship between the modulated chrominance subcarrier transmitted via line 4 and the additional voltage on line 7. Different advantageous embodiments for the processing circuit will be described below.

Figure 2:
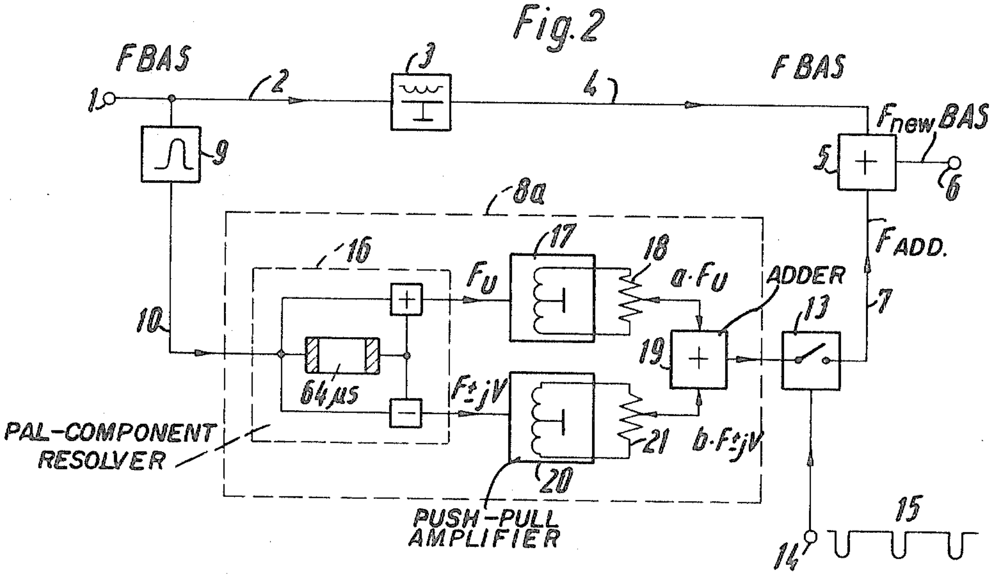
FIG. 2 is a block circuit diagram of one preferred embodiment of the invention.

FIG. 2 shows a relatively simple embodiment constituted by a processing circuit 8*a* containing a known PAL resolving circuit 16 in which, by the use of a delay line providing a delay of one scanning line period, the modulated chrominance subcarriers corresponding to two chronologically consecutive picture lines fed via conductor 10 are both added and subtracted. The addition yields the component $F_U$, while the subtraction yields the component $F_{\pm jV}$, the components being at the chrominance subcarrier frequency and corresponding to the two PAL modulation axes.

The signal component $F_U$ is fed into a push-pull circuit 17 which contains, for example a transformer having a center-tapped secondary, and which feeds a voltage proportional to this signal component to one side of the potentiometer 18 and an equal voltage of the opposite polarity to the other side of potentiometer 18 at whose movable output tap there is then available a signal having an amplitude $a \cdot F_U$, where $a$ can be set to any value between −1 and +1. This signal is fed to one input of an adder 19.

In the same way, the signal $F_{\pm jV}$ is fed into a push-pull circuit 20 which feeds a potentiometer 21. At the output of this potentiometer there is a signal $b \cdot F_{\pm jV}$ where $b$ can also be set to any value between −1 and +1. This signal is fed to a second input of the adder 19.

FIGS. 3*a* to 3*d* are vector diagrams in which the amplitude and phase of the chrominance subcarrier is shown with regard to those picture field lines (NTSC lines) for which the transmitted chrominance subcarrier has a +*j*V component. Corresponding values, mirrored by the horizontal axis U, apply for the lines (PAL lines) in which a −*j*V component is being transmitted. FIGS. 3*a* to 3*d* illustrate the operation of the processor 8*a* of FIG. 2.

Figure 3A:
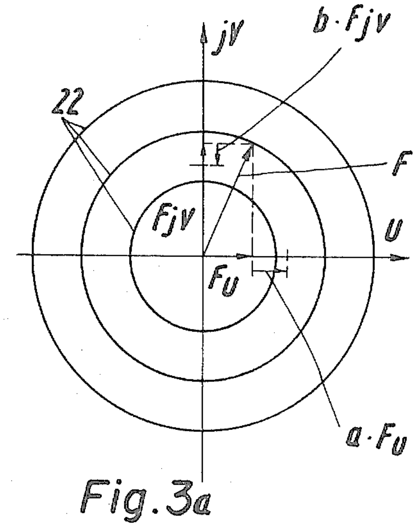
FIGS. 3*a*, 3*b*, 3*c* and 3*d* are vector diagrams illustrating the operation of the embodiment of FIG. 2.

FIG. 3*a* shows, with respect to the two modulation axes U and *j*V of the quadrature-modulated PAL chrominance subcarrier, a modulated chrominance subcarrier vector F. The locus curves 22 for chrominance subcarrier vectors F of constant amplitude are circles. When the chrominance subcarrier is resolved in the resolving circuit 16, component signals $F_U$ and $F_{\pm jV}$ result and are applied to the potentiometers 18 and 21, respectively. From the potentiometers 18 and 21 the fractions $a \cdot F_U$ and $b \cdot F_{\pm jV}$ are obtained, and are combined in the adder 19 to form the additional voltage, or signal.

Figure 3B:
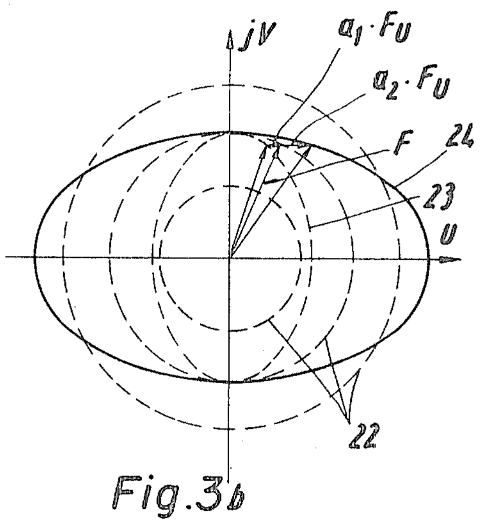

When, for example, as shown in FIG. 3*b*, a component $a_1 \cdot F_U$, $a_1$ being negative, is added to the chrominance subcarrier F, the locus curve 22 of the chrominance subcarrier vector F changes into an elliptical locus curve 23 which corresponds to a reduced component $F_U$ and an unchanged component $F_{\pm jV}$. When a component $a_2 \cdot F_U$ is added, where $a_2$ is positive, the elliptical locus curve 24 results which corresponds to an increased component $F_U$. When the setting with $a_1$ is used, the color corresponding to the axis U is reduced, whereas at the setting $a_2$ the color corresponding to the axis U is increased. The circular locus curves 22 are thus transformed into elliptical locus curves 23, 24.

Figure 3C:
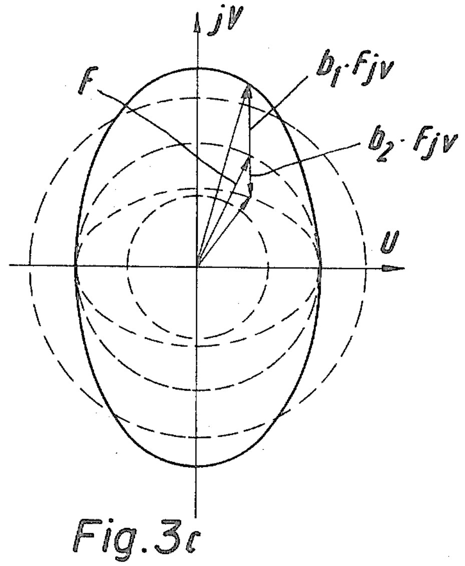

FIG. 3*c* shows the same relationships for variations in the setting of potentiometer 21. It can be seen that various settings for the potentiometers 18 and 21 can produce different locus curves for the chrominance subcarrier vector F and independent increases and decreases in the colors corresponding to the U and *j*V axes.

Figure 3D:
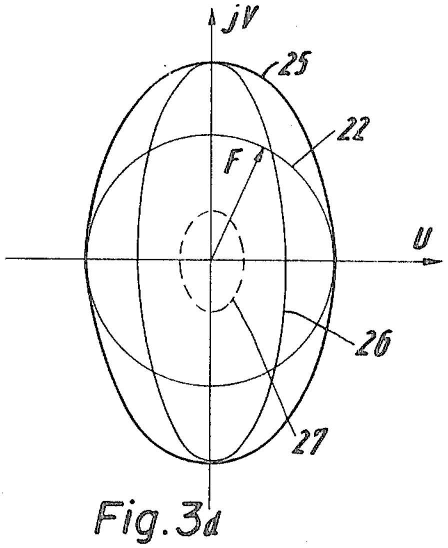

FIG. 3*d* shows different deformations of the locus curve of the chrominance subcarrier vector F. In an unmodified color video signal the locus curve 22 is associated with the chrominance subcarrier vector F. When, for example, the movable tap of the potentiometer 21 is adjusted upwardly in the direction of a positive additional potential $b \cdot F_{\pm jV}$, the component of the chrominance subcarrier in the direction of the U axis remains unchanged whereas the component in the direction of the *j*V axis is increased so that the locus curve 25 results for the chrominance subcarrier, which indicates an increase in the color associated with the *j*V axis. If now, additionally, the pickup of the potentiometer 18 is adjusted downwardly, i.e. in the direction of a negative additional potential component, the chrominance subcarrier U axis component is reduced so that the locus curve 26 results for the chrominance subcarrier, which indicates a decrease in the color associated with the U axis. If the pickups of both potentiometers 18 and 21 are then adjusted downwardly, i.e., in the direction of negative additional potential components, the chrominance subcarrier is altered with reference to both axes, thus resulting in a locus curve 27. This locus curve corresponds to a marked decrease in the dominance subcarrier amplitude, which may be desired when a slow transition to a pure black-and-white picture is intended.

Figure 4:
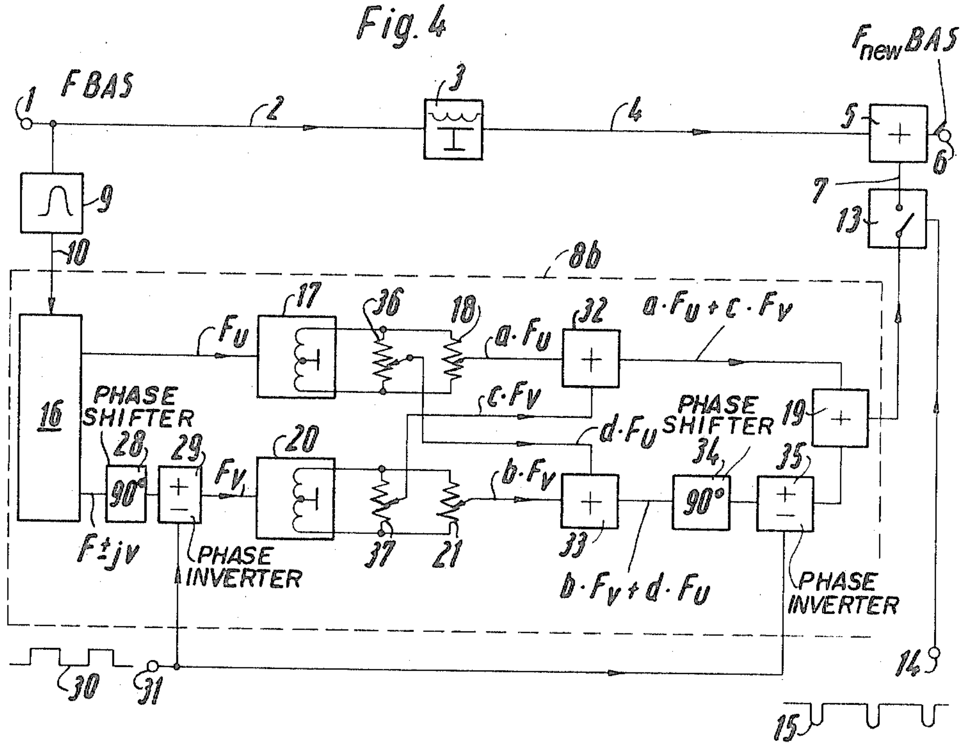
FIG. 4 is a block diagram of another embodiment of the invention.

FIG. 4 shows a circuit 8*b* constituting a modified version of the circuit of FIG. 2. By means of a 90° phase shifter 28 and a 180° inverter 29, which is switched, for the signal associated with each succeeding picture line, between the phase positions of 0° and 180° by a switching voltage 30 at one-half the picture line, or horizontal scanning, frequency and delivered to a terminal 31, the component $F_{\pm jV}$ is acted on in such a way that they are given the same phase, which is subject to 180° phase shifts imparted by the superimposed carrier wave, so that the signals $F_U$ and $F_V$ result.

An additional signal component $a \cdot F_U$ which is variable as to both polarity and amplitude, is again derived from potentiometer 18 and fed to an adder 32, whereas, correspondingly, an additional component $b \cdot F_V$, also variable with respect to both amplitude and polarity, is derived from potentiometer 21 and fed to an adder 33. The output voltages from the adders 32 and 33 are combined in the adder 19 after reinsertion of the 90° phase shift therebetween by means of a phase shifter 34 and of the 180° PAL shift by means of a 180° phase inverter 35 which is also controlled by the switching voltage 30.

Additionally, in this embodiment, a supplemental component $d \cdot F_U$, whose amplitude and polarity can be varied by a potentiometer 36, is added to the component $b \cdot F_V$ in the adder 33, while a supplemental component $c \cdot F_V$, which can be varied as to amplitude and polarity by a potentiometer 37, is added to the component $a \cdot F_U$ in the adder 32. Thus, each component of the addition signal $F_{add}$ can be constituted by any combination of fractions of both chrominance signal components.

The operation of the circuit of FIG. 4 will be explained with the aid of the vector diagrams in FIG. 5. When, for example, according to FIG. 5*a*, the chrominance subcarrier vector F lies exactly in the *j*V axis, i.e., $F_U$ equals 0, it is not possible with the circuit described in FIG. 2 to create or increase a color having a component along the U axis because no additional signal representing this color can be derived from the chrominance subcarrier.

If now, however, it is intended to generate such a color, this is achieved in the circuit of FIG. 4 by deriving a fraction of the component $F_V$ from potentiometer 37 and by utilizing this fraction as the U axis component of the additional signal $F_{add}$. Thus, a potential associated with one hue is used to influence the potential associated with another hue.

Figure 5A:
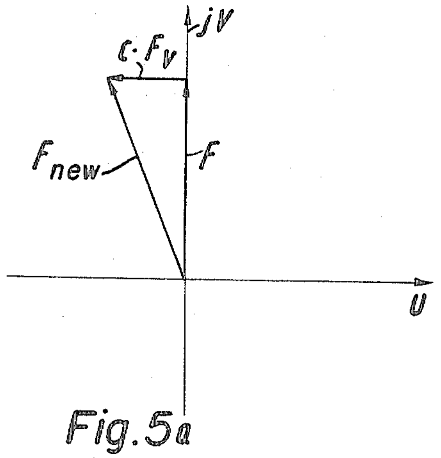
FIGS. 5*a*, 5*b* are vector diagrams used in explaining the operation of the embodiment of FIG. 4.

According to FIG. 5a, a fraction $c \cdot F_V$, $c$ being negative, is added to the chrominance subcarrier F in the channel of the additional signal component $F_U$ so that a new chrominance subcarrier $F_{new}$ results which now has a component along the U axis. A color component along the U axis is thus created which was not originally contained in the chrominance subcarrier. In the same manner, a portion $\pm jd \cdot F_U$ along the axis $jV$ can be derived from the U axis signal component $F_U$.

Figure 5B:
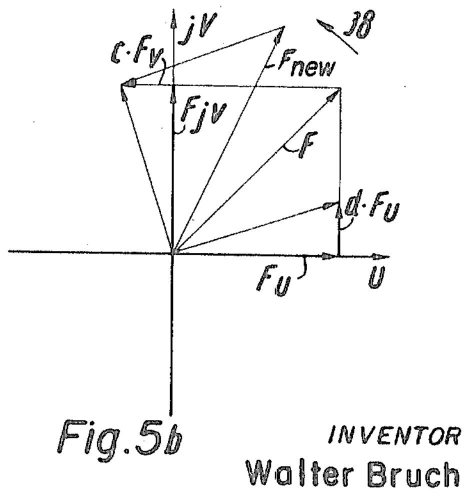

FIG. 5b shows the relationships when a fractional component $c \cdot F_V$ along the U axis and a fractional component $d \cdot F_U$ along the $jV$ axis are added to the chrominance subcarrier F. It can be seen that this causes the overall resultant vector to rotate in the direction of arrow 38, which corresponds to a change in hue.

Figure 6:
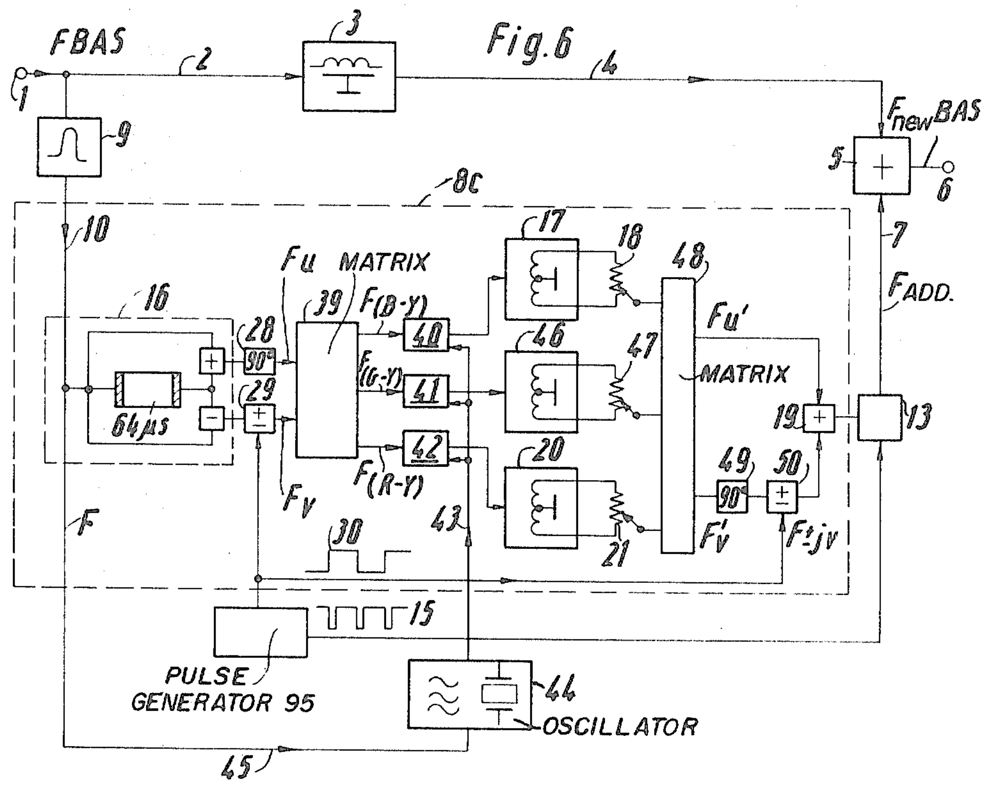
FIG. 6 is a block diagram of a further embodiment of the invention.

FIG. 6 shows a circuit 8c in which three colors associated with respectively different modulation axes can be increased or decreased independently of one another. The PAL resolving circuit 16 and the members 28 an 29 operate as the arrangement of FIG. 4. The two components $F_U$ and $F_V$ of the chrominance subcarrier, which have the same phase, appear at the output of stages 28, 29 and are decoded in a matrix 39 into signal components at the chrominance subcarrier frequency whose amplitudes represent the color difference signals B–Y, G–Y, and R–Y. Such matrices, which may be constituted by a simple resistive network, are well-known in the art.

These voltages are applied to three polarity control devices 40, 41 and 42, which are additionally fed, via a line 43, with a reference carrier which always has the same polarity as the positive polarity chrominance subcarrier components at the outputs of matrix 39. The reference carrier is generated in an oscillator 44 which is synchronized by the color-synchronizing signals fed thereto via line 45. The devices 40, 41 and 42 cause the chrominance subcarrier components appearing at their outputs to always have the same polarity, i.e., to be freed from modulation-dependent 180° phase shifts. Such devices are described in detail in the German publication "Rundfunktechnische Mitteilungen" (Radio Communication News), 1965, pages 195—196.

The output signals of the devices 40, 41 and 42 are fed via respective push-pull circuits 17, 46 and 20 to three potentiometers 18, 47 and 21, respectively. Fractional components picked up from the movable tops of the potentiometers 18, 47 and 21, which components are individually adjustable as to polarity and amplitude, are fed into a matrix 48 and are there reconverted into two additional chrominance subcarrier components $F_U'$ and $F_V'$corresponding to the PAL modulation axes U and V.

By means of a 90° phase shifter 49 and a line-frequency-operated 180°-phase inverter 50, which is controlled by the switching voltage 30 from a pulse generator 95, chrominance subcarrier component $F_V'$ is converted into a component $F_{\pm jV}'$ and the components $F_U'$ and $F_{\pm jV}'$ are combined in the adder 19 into a composite chrominance subcarrier additional signal $F_{add}$, which is then brought into adder 5, via blanking stage 13, as an additional signal.

When, for example, the taps of the three potentiometers 18, 47 and 21 are in their center positions, the additional signal coming over line 7 equals zero and the picture color is unchanged. An upward displacement of the tap of the potentiometer 18, for example, produces an increase in the blue component and at the same time a decrease in the complementary color, yellow. A downward displacement of the tap produces a decrease in the blue component and thus an increase in the yellow component.

Figure 7:
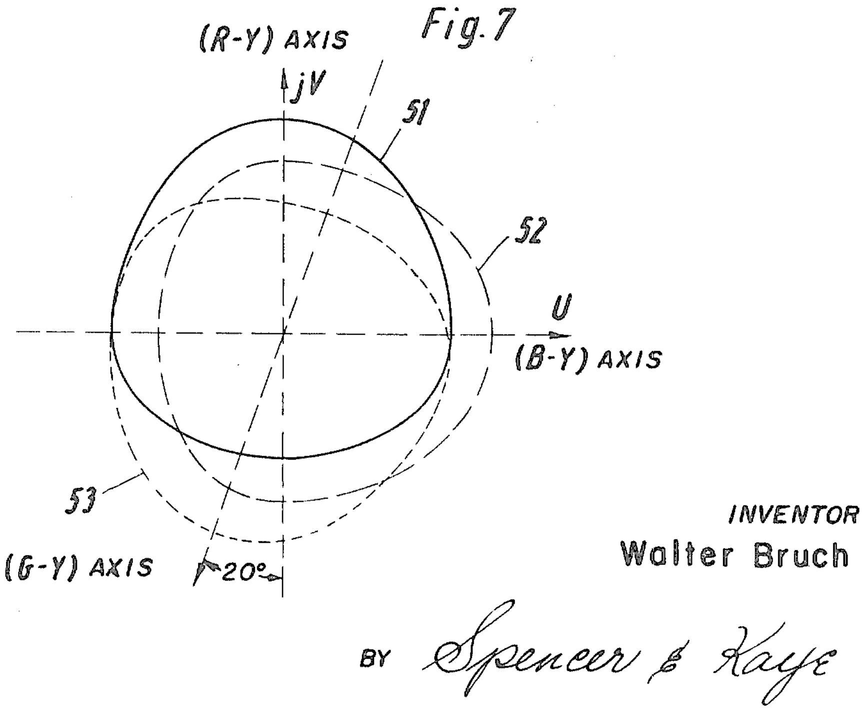
FIG. 7 is a vector diagram used in explaining the operation of the embodiment of FIG. 6.

FIG. 7 shows how the locus curve of the vector of a constant chrominance subcarrier amplitude can be changed by means of the processor 8c of FIG. 6. When, for example, the locus curve 51 is to be created, which indicates an increase in the color associated with R–Y, the taps of the potentiometers 18 and 47 will remain in their center positions and will feed not voltage to the matrix 48. The tap of potentiometer 21, which furnishes the component corresponding to the R–Y axis, which here coincides with the $jV$ axis, is upwardly displaced so that a positive component can be picked up and fed to the matrix 48. This component always has a positive polarity relative to the modulation axis R–Y due to the action of device 42. If, thus, the chrominance subcarrier contains a component along the R–Y axis, this component is increased by the additional signal to produce the locus represented by curve 51. If the chrominance subcarrier contains a component along the –(R–Y) axis, the additional component will, for the same setting of potentiometer 21, still have the same polarity as the R–Y axis, due to the action of device 42, in spite of the reversed polarity of the chrominance subcarrier signal component fed to device 42, so that the amplitude is here decreased with respect to the –(R–Y) axis, as shown by curve 51 which is thus composed of two half-ellipses of different shapes.

The same applies for any other axis which can be arbitrarily selected. Locus curve 52 is produced by operation of the potentiometer 18 (increase in B–Y) and locus curve 53 by operation of potentiometer 47 (increase of G–Y). The elements 49, 50 always assure that the polarity of the component of the additional signal, associated with the U axis, is not changed and that the polarity of the component of the additional signal, associated with the $jV$ axis, is shifted by 180° from one picture line to the next.

FIG. 8 shows one advantageous design for the control of potentiometers 18, 47 and 21 of the circuit of FIG. 6. In the respective center positions of the control sticks 54, 55 and 56, the potentiometers do not add any color component, whereas in the upper control stick position they increase the component of their respective color and in the lower position they decrease the component of this same color.

In FIG. 9 the three control sticks 54, 55 and 56 of FIG. 8 are replaced by a single control stick 57. The control stick 57 is coupled to the taps of the potentiometers 21, 47 and 18 by means of a mechanical linkage in such a manner that each one of the potentiometers 21, 47 and 18 can be operated thereby. The control stick 57 is arranged to be moved, for example in any one of three directions offset by 120° from one another, each direction providing an adjustment of a respective one of the potentiometers 21, 47 and 18. The individual color components can here be adjusted by a single control stick.

In the circuit 8d, shown in FIG. 10, the additional signal is produced by acting on the output of an oscillator 58 oscillating at the chrominance subcarrier frequency, the output from this oscillator being synchronized with the chrominance subcarrier frequency by means of the color-synchronizing signals, or color bursts. The color burst signals are extracted from the chrominance subcarrier signal appearing on conductor 10 by means of a gate 59 which is controlled by a switching potential 60 so as to be open, i.e. conductive, only during the occurrence of the color-synchroniz-signals.

The unmodulated output from oscillator 58 is delivered from push-pull circuit 17 to potentiometers 61 and 62. The taps of these potentiometers can be set to any position to give the resulting additional signal any desired phase and amplitude. The potentiometer 62 provides the U component for such signal while potentiometer 61 provides the V component thereof. The output from potentiometer 62 is delivered directly to one input of adder circuit 19. The output from potentiometer 61 is subjected to a 90° phase shift by circuit 34 and to a PAL shift by the inverter 35 to form the $\pm jV$ component which is delivered to the other input of adder 19. The resulting signal $F_{add}$ is delivered to adder circuit via gate 13 during the intervals between color bursts.

FIG. 11 illustrates the operation of the circuit of FIG. 10. Let it be assumed that the picture contains an undesirable, unvarying residual chrominance subcarrier F which creates, for example, an undesirable color tint across the entire picture in a black-and-white picture. Because of the PAL shift, this interfering chrominance subcarrier alternates from line to line between the values F and F*. A compensating chrominance subcarrier giving rise to alternating vectors $F_{comp}$ and $F^*_{comp}$ can be established with the potentiometers 61, 62 and delivered to line 7, thus removing the chrominance subcarrier F, F* contained in the FBAS color video signal from the modified signal appearing at terminal 6, and consequently the undesired color tint. This circuit can also be used to apply a desired color tint to the picture by delivering a chrominance subcarrier of the phase corresponding to the desired color to line 7.

FIG. 12 shows the circuitry of a processor 8e in which the amplitude of the chrominance subcarrier contained in the FBAS color video signal is varied in dependence on the amplitude of the luminance signal Y. Such a control of the chrominance subcarrier can be desirable, for example, for the telecasting of certain special color films where it often occurs that in dark picture portions too strong a color saturation has an annoying effect and should thus be reduced as much as possible, whereas the color saturation is correct in the lighter picture portions and thus should remain uninfluenced.

To accomplish this result, the chrominance subcarrier F which has been selectively extracted via the band-pass filter 9 is fed, via line 10 and a 180° phase inverter 63 as well as via a delay line 66, into a variable gain amplifier 64 whose amplification can be controlled by the voltage applied via a line 65. The variably amplified chrominance subcarrier is conducted from the controllable amplifier 64 to a potentiometer 18. The voltage at the movable potentiometer tap constitutes the additional signal which is fed via gate 13 and line 7 to adder 5.

The luminance signal Y, which has been separated from the chrominance subcarrier component by the band stop filter 11, is brought via line 12 into a low-pass filter 67 having an upper limit frequency of about 1 mHz. and from there to a clamping circuit 68 which provides a voltage corresponding to a certain portion of the luminance signal, this being inserted, for example, during the back porch period. The thus clamped luminance signal is conducted via a function generator 69 to a line 65 to serve as the amplification control voltage to amplifier 64.

Figure 13:
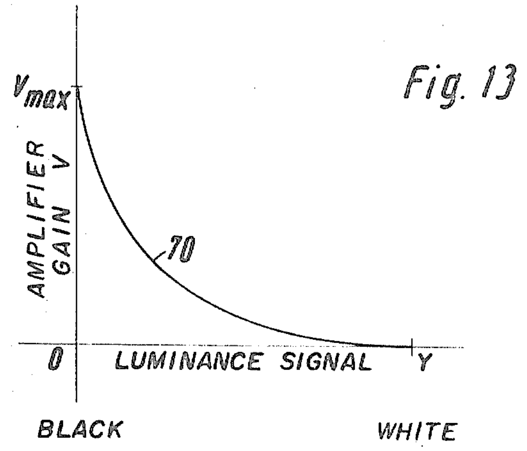
FIG. 13 is a curve representing the operation of a portion of the embodiment of FIG. 12.

The operation of the circuit of FIG. 12 is explained with the aid of FIG. 13. The generator 69 produces an output which is a nonlinear function of the luminance signal Y, the relationship provided being represented by the curve 70. Curve 70 represents the variation in the amplication, V, of the amplifier 64 as a function of the luminance signal level. For dark picture segments ($Y \approx 0$ in the case of positive transmission, or $Y \approx Y_{max}$ in the case of negative transmission) a maximum amplification signal is passed by the harmonic generator 69 and adjusts the amplification of the amplifier to a high value so that a relatively high additional signal is added, via conductor 7, in the adder 5 to the FBAS color video signal.

This additional signal is shifted in phase by 180° with respect to the chrominance subcarrier in the FBAS color video signal coming from line 4 by the phase inverter 63 so that the additional signal serves to reduce the amplitude of the chrominance carrier in the desired manner for these dark picture segments. For light picture segments ($Y \approx Y_{max}$ in the case of positive transmission, or $Y \approx 0$ in the case of negative transmission) the amplification of amplifier 64 is adjusted to a low value (e.g. even zero). An additional signal having a relatively low amplitude now reaches the adder 5 via line 7, so that the amplitude of the chrominance subcarrier of the FBAS color video signal coming from line 4 is less strongly reduced, or not reduced at all as desired.

The characteristic 70 of the generator stage 69 can have different forms to adapt the reduction of the chrominance subcarrier amplitude to different conditions. For example, this reduction can occur only for certain values of the luminance signal Y and can be completely suppressed for other values of the signal.

Another manner of modifying the color of a television picture will now be described below with reference to FIGS. 14—17.

Figure 14:
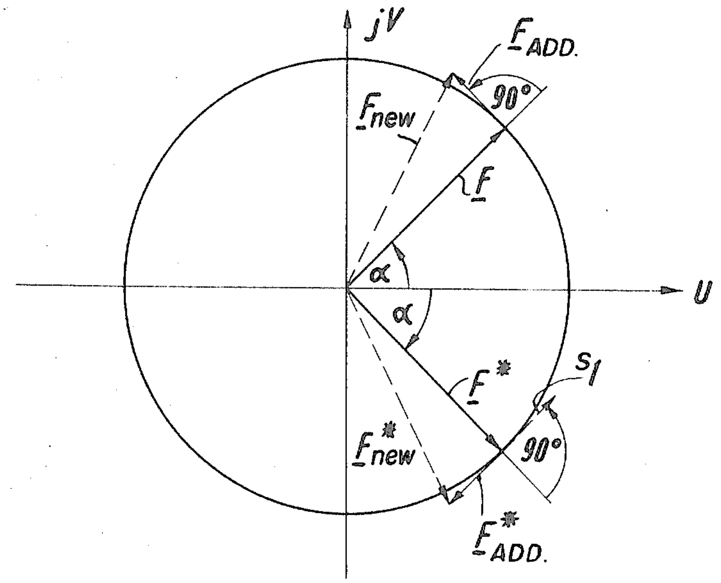
FIG. 14 is a vector diagram illustrating another type of color modification according to the invention.

FIG. 14 is a vector diagram illustrating the modulated PAL chrominance subcarrier F for a first picture line and the reflected, with respect to axis U, conjugate complex chrominance subcarrier F* for the next succeeding picture line. The color hue created in the picture by these chrominance subcarriers is represented by the angle $\alpha$. To change the hue, the chrominance subcarrier F can be phase shifted by 90° in a second channel and a selected fraction of the shifted signal can be obtained to produce an additional signal $F_{add}$ which is added to the chrominance subcarrier F. This results in a new chrominance subcarrier $F_{new}$ which has a different phase angle with respect to axis U and which thus represents a different color. It may be appreciated that this procedure will produce a constant angular shift for the chrominance subcarrier regardless of the amplitude or phase angle of the original chrominance vector.

For the next succeeding picture line the chrominance subcarrier F* is also shifted by 90° in the second channel so that first the additional signal $S_1$ shown in dashed lines results. This is shifted in phase by 180° by a PAL 180° phase inverter acting on the chrominance subcarrier of every other picture line, thus creating the additional signal $F^*_{add}$ which converts the chrominance subcarrier F* into a chrominance subcarrier $F^*_{new}$. Since the two chrominance subcarriers of successive picture lines are shifted, according to the invention, in respectively opposite directions, a genuine change in information results which represents a shift in color and which will not appear as an error which could be eliminated in the PAL receiver provided with a controlled delay.

Figure 15:
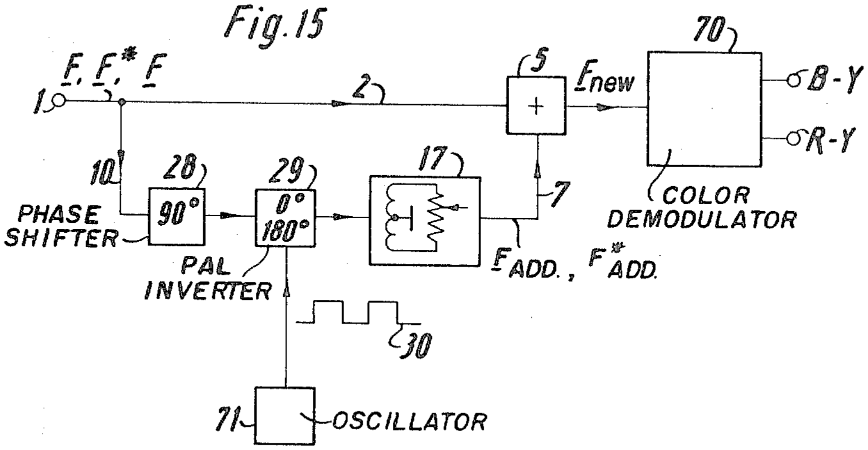
FIG. 15 is a block diagram of a still further embodiment of the invention for producing the operation illustrated in FIG. 14.

In FIG. 15 there is shown one circuit for producing this result in which the successive modulated chrominance subcarriers F, F*, F are conducted from a terminal 1 over a line 2 into an adder 5 whose output is connected to a color demodulator 70 which furnishes at two terminals the demodulated color minus luminance signals B–Y and R–Y for the picture reproduction. According to the present invention the modulated chrominance subcarrier is conveyed through a second channel via a line 10, this second channel containing a 90° phase shifter 28 and a 180° controlled PAL phase inverter 29 which is controlled by a generator 71 producing a switching potential 30 at one-half the line scanning frequency. The output voltage from the phase inverter 29 is applied to a push-pull circuit 17 from which an additional chrominance subcarrier having an adjustable amplitude and polarity is fed into the adder stage 5 via a line 7.

The phase shifter 28 shifts the chrominance subcarrier F shown in FIG. 14 by 90° whereas the phase inverter 29 inverts the phase of the chrominance subcarrier associated with every other picture line (F* in FIG. 14). The push-pull circuit 17 permits the additional signals to be given any desired relative amplitude and polarity so that at the output of the adder 5 a chrominance subcarrier $F_{new}$ results which is influenced in the shift of a change in color, and which thus furnishes at the output of the demodulator 70 color signals which are different from those transmitted and which produce a different color distribution in the reproduced picture.

Figure 16:
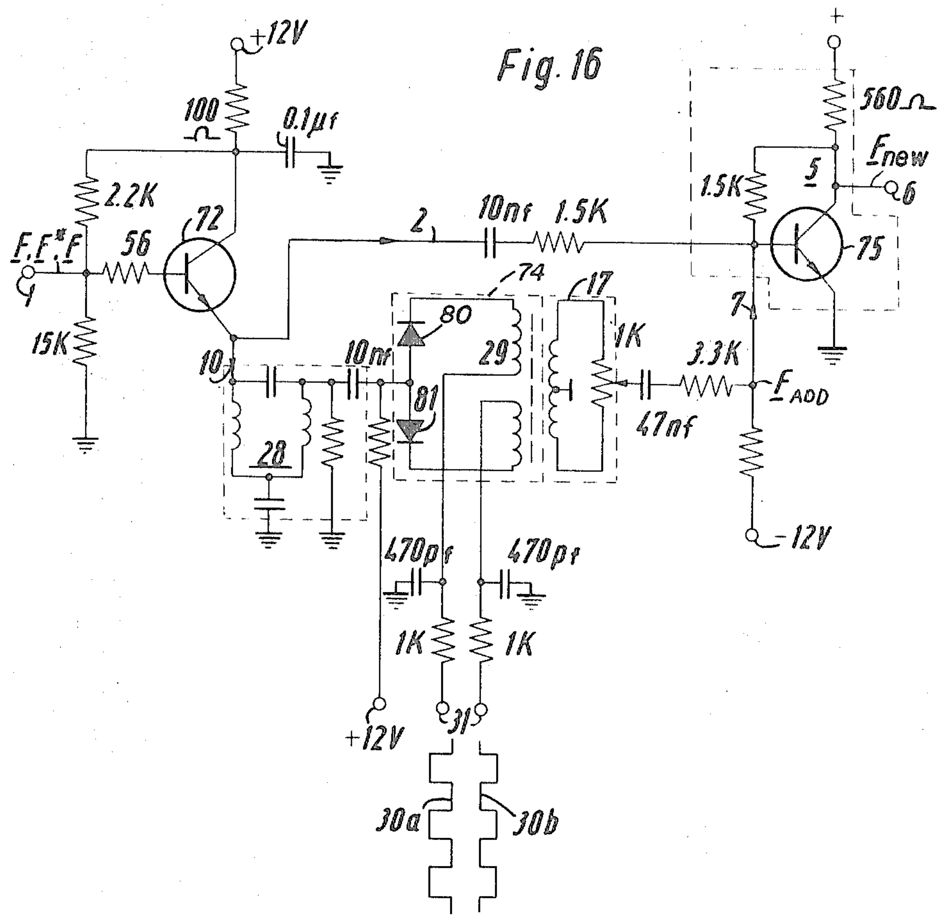
FIG. 16 is a circuit diagram of the arrangement illustrated in FIG. 15.

FIG. 16 shows a practical circuit embodiment of the device of FIG. 15 wherein values for various circuit components are shown. The chrominance subcarrier F, F* present at terminal 1 is amplified in a transistor stage 72. A suitable passive circuit serves as the 90° phase shifter 28, and a push-pull transformer 74 having two switching diodes 80, 81 serves as the 180° PAL inverter 29. These diodes are controlled to be alternately conductive and nonconductive by opposite-phase, half-line frequency switching potentials 30a and 30b applied at terminals 31. The adder 5 is constituted by a transistor 75 at whose base the modulated chrominance subcarrier from line 2 and the supplemental chrominance carrier from line 7 are added. The chrominance subcarrier $F_{new}$ which represents a shift in color is available at terminal 6.

FIG. 14 shows that such a shift in color causes a slight increase in amplitude to occur in the chrominance subcarrier, i.e. an increase in the color saturation. Generally this change in color saturation will be insignificant because usually only slight phase variations are required for the color shift.

This variation in amplitude can be eliminated, when desired, by the addition of a further additional signal to the modulated chrominance subcarrier, which further signal is in phase with the modulated chrominance subcarrier and has such an amplitude that the amplitude of the chrominance subcarrier remains unchanged when the color shift is effectuated.

Figure 17:
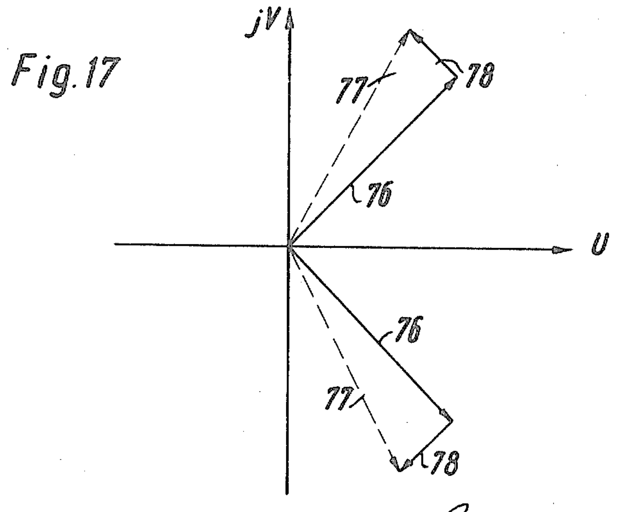
FIG. 17 is a vector diagram illustrating another type of color modification according to the invention.

Another technique for keeping the color saturation at a constant level is illustrated in FIG. 17 which shows in vector diagram form the color-synchronizing signal 76, which is shifted from one picture line to the next between 45° and −45° phase position relative to the axis U. If the circuit for shifting the color according to the present invention also acts on the color-synchronizing signal, i.e., for example when the color-synchronizing signal is also fed into the circuit of FIGS. 15 and 16, according to FIG. 17 the color-synchronizing signal is also shifted in phase by an additional signal 78 and thus is also increased in amplitude. If now an automatic color gain control (ACC) is provided in addition to the color shifting circuit according to the present invention, the phase-shifted and amplitude-increased color-synchronizing signal 77 is monitored there. Since this signal now has an increased amplitude, the amplification of the chrominance subcarrier is adjusted downwardly so that the increased amplitude of the chrominance subcarrier shown in FIG. 14 is eliminated.

In FIGS. 15 and 16 the additional chrominance subcarrier in the color channel is added to the modulated chrominance subcarrier. It is also possible to add the additional chrominance carrier to the complete FBAS color video signal. To accomplish this, in the second channel there is provided a band-pass filter which passes only the chrominance subcarrier required to provide the additional chrominance signal.

If the 180° PAL inversion is eliminated, the circuits according to the invention can also be employed to vary the color in an NTSC color television receiver or studio. The circuits of FIGS. 10, 12, 15 and 16 are particularly well adapted for use in NTSC systems since the operation of these circuits does not require a resolution of the color information into its orthogonal vector components. However the other illustrated circuits could be employed in an NTSC system if provided with suitable means for deriving the two vector components of the modulated chrominance subcarrier.

The present invention thus presents circuit arrangements for varying the tint or color of an image produced by a PAL color television signal and consists in that a fraction of the chrominance subcarrier, which is subjected to the PAL inversion, is added to the modulated PAL chrominance subcarrier as an additional potential, or signal, having an adjustable relative amplitude and phase.

The additional potential is added, for example, to the FBAS color video signal. It can be derived, for example, from the chrominance subcarrier which has been selectively extracted from the FBAS color video signal. The additional potential can also be produced in an oscillator which oscillates at the chrominance subcarrier frequency and which is synchronized by color-synchronizing signals. In this case, for example, the phase of the additional potential can be adjusted according to the influence desired on the hue.

In one embodiment of the present invention a plurality of additional potentials representing different color components, e.g. red, green and blue, are combined in a matrix to form composite additional potential at the chrominance subcarrier frequency, each of the individual potentials being adjustable in polarity and relative amplitude. The composite additional potential is then, after being subjected to the PAL inversion, added to the FBAS color video signal.

The amplitude of the additional potential added to the FBAS color video signal can also be made dependent on the amplitude of the corresponding luminance signal. In many cases it can be advisable to effect a change in color saturation, e.g. an elimination of the supersaturation of dark image segments, or of a color tint still present in the white areas, of black and white pictures. Experience has shown that the remaining color tint in a black-and-white picture is particularly annoying in particularly dark or particularly light picture segments.

The present invention makes possible a change in chroma to a very large extent. A substantial advantage of the invention is that the change in hue can be accomplished merely by the addition of an additional potential to the FBAS color video signal so that this FBAS signal is thus not influenced at all when no change in hue is effectuated.

It will be understood that the above description of the present invention is susceptible to various modifications, changes, and adaptations, and the same are intended to be comprehended within the meaning and range of equivalents of the appended claims.

I claim:

1. A circuit for modifying the color information contained in the originally produced video signal portion of a PAL-color television signal comprising, in combination:

a. a PAL color component resolver connected to receive the modulated chrominance subcarrier of the originally produced video signal portion and to produce two outputs each representing one orthogonal component of the chrominance subcarrier modulation, said resolver being arranged to provide at one of its outputs a signal produced by adding the modulated chrominance subcarriers of two successive picture lines and to provide at the other of its outputs a signal produced by subtracting the modulated chrominance subcarriers of two successive picture lines;

b. circuit means connected to the outputs of said resolver for combining adjustably selected proportions of the signals appearing at said outputs to produce an additional modulated chrominance subcarrier signal, said circuit means comprising: phase-shifting means connected to the outputs of said resolver for causing the signals from said resolver to be in phase; first matrix means connected to receive the in-phase resolver outputs and arranged to produce signal components whose amplitudes represent components of the modulation of the chrominance subcarrier; amplitude-adjusting means connected to the outputs of said first matrix means for producing color components whose amplitudes are selected fractions of the amplitudes of the outputs from said first matrix means; second matrix means connected to receive the color components and arranged to produce two modulated outputs which are phase-shifted by 90° with respect to one another, each output being in phase with one modulation axis of the modulation chrominance subcarrier of the originally produced video signal portion; PAL inversion means connected to said second matrix means for inverting the phase of one of the modulated outputs from said second matrix means from one picture line to the next; and second adding means connected to receive the PAL inverted output and the other modulated output from said second matrix means for producing the additional modulated chrominance subcarrier signal; and c. signal adding means connected to receive and add together the originally produced video signal portion and the additional signal to produce a new modulated chrominance subcarrier containing color information which is modified relative to that contained in the chrominance subcarrier of the originally produced video signal portion 2. A circuit for modifying the color information contained in the originally produced video signal portion of a PAL-color television signal comprising, in combination:

a. a PAL color component resolver connected to receive the modulated chrominance subcarrier of the originally produced video signal portion and to produce two outputs each representing one orthogonal component of the chrominance subcarrier modulation, said resolver being arranged to provide at one of its outputs a signal produced by adding the modulated chrominance subcarriers of two successive picture lines and to provide at the other of its outputs a signal produced by subtracting the modulated chrominance subcarriers of two successive picture lines;

b. circuit means connected to the outputs of said resolver for combining adjustably selected proportions of the signals appearing at said outputs to produce an additional modulated chrominance subcarrier signal, said circuit means comprising: phase-shifting means connected to the outputs of said resolver for causing the signals from said resolver to be in phase; first matrix means connected to receive the in-phase resolver outputs and arranged to produce three signal components whose amplitudes represent the three color-minus-luminance components of the modulation of the chrominance subcarrier; and polarity control means connected to the outputs of said first matrix means and arranged for causing the phase of each color-minus-luminance component to be always positive with respect to the modulation axis of its associated primary color; and c. signal adding means connected to receive and add together the originally produced video signal portion and the additional signal to produce a new modulated chrominance subcarrier containing color information which is modified relative to that contained in the chrominance subcarrier of the originally produced video signal portion.

3. An arrangement as defined in claim 1 wherein said first matrix means constitute means for producing three signal components whose amplitudes represent the three-color-minus-luminance components of the modulation of the chrominance subcarrier.

UNITED STATES PATENT OFFICE
CERTIFICATE OF CORRECTION

Patent No. 3,588,321 Dated June 28th, 1971

Inventor(s) Walter Bruch

It is certified that error appears in the above-identified patent and that said Letters Patent are hereby corrected as shown below:

In the heading of the patent, line 9, change "June 12,1968" to --August 18, 1967--. Column 4, line 59, change "addition" to --additional--. Column 5, line 18, change "an" to --and--.

Signed and sealed this 29th day of February 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE 1969 O—366-334